April 14, 1959   H. R. JOHNSON ET AL   2,882,103
HINGE CONNECTIONS FOR TRACTOR TRACKS
Filed July 19, 1957   2 Sheets-Sheet 1
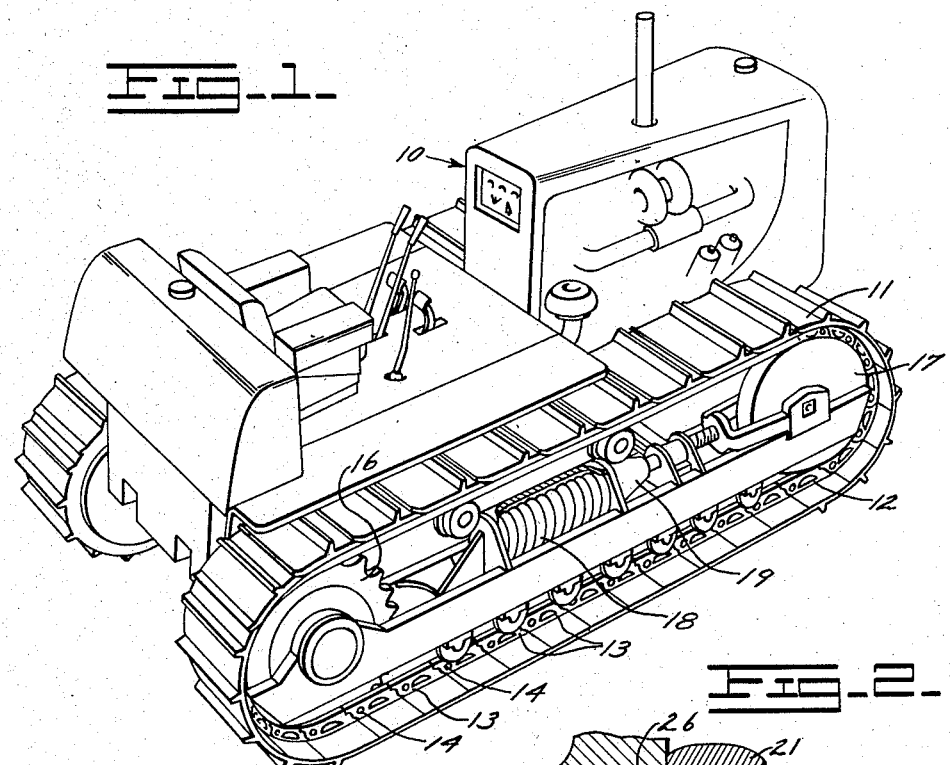
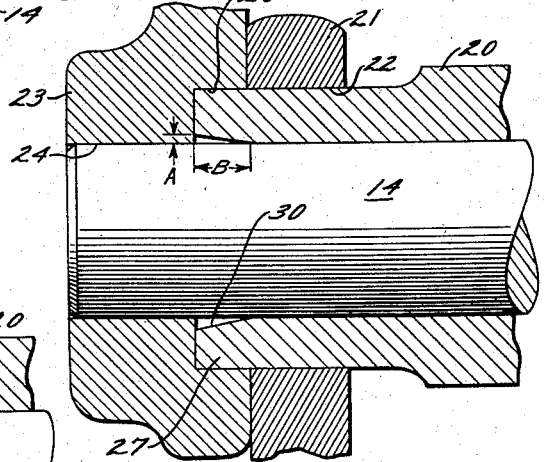
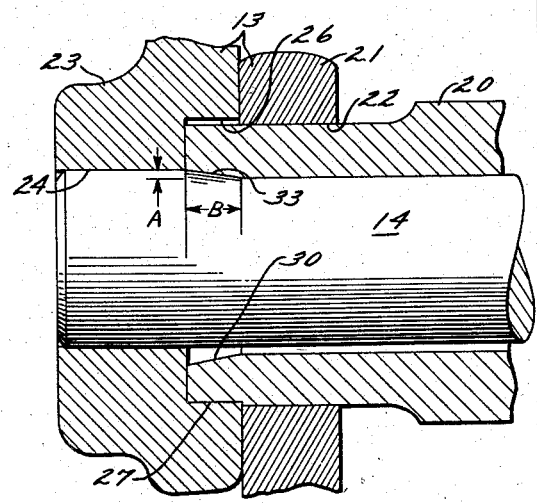
INVENTORS
HAROLD R. JOHNSON
DELMAR R. LAMMERS
BY
ATTORNEYS

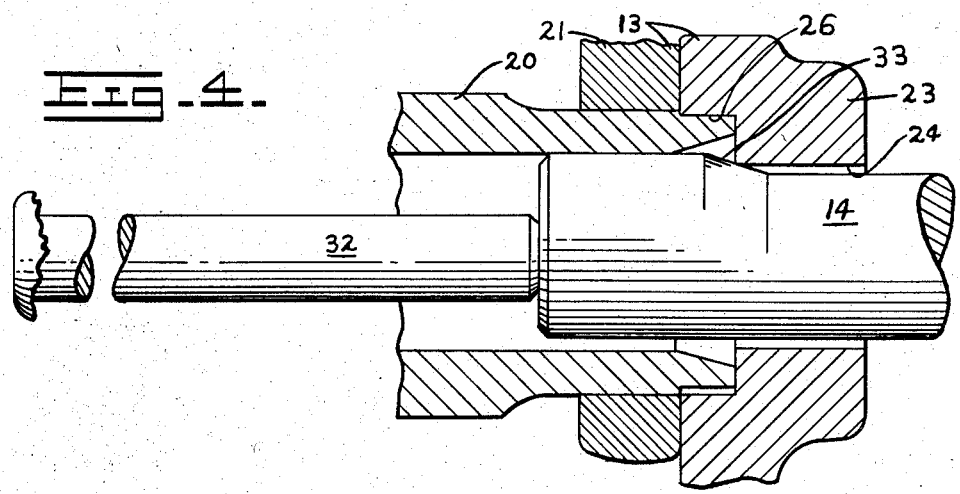
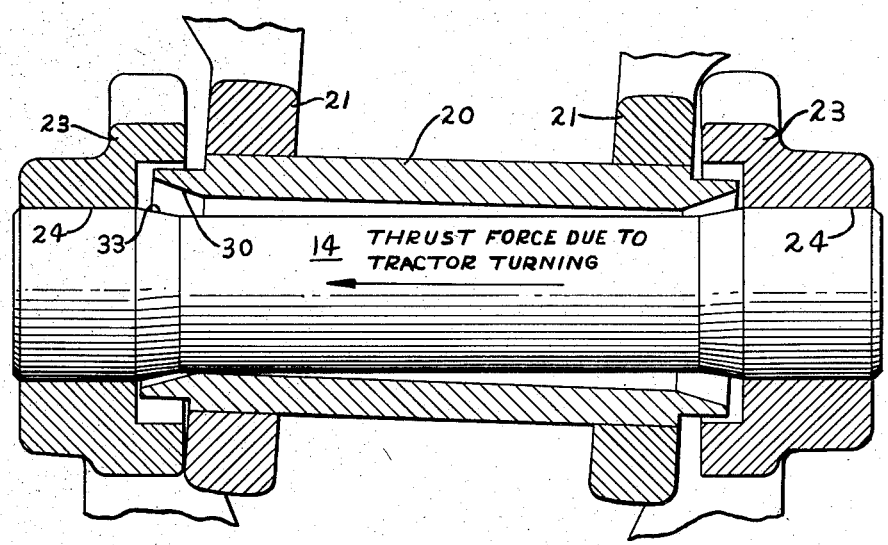
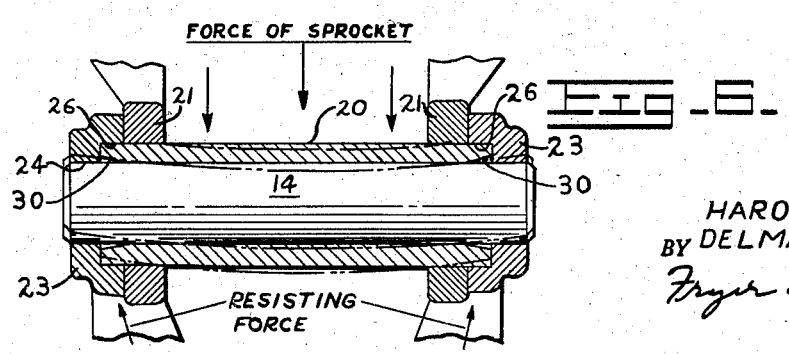

United States Patent Office 2,882,103
Patented Apr. 14, 1959

2,882,103

HINGE CONNECTIONS FOR TRACTOR TRACKS

Harold R. Johnson and Delmar R. Lammers, Peoria, Ill., assignors to Caterpillar Tractor Co., Peoria, Ill., a corporation of California Application July 19, 1957, Serial No. 673,054

4 Claims. (Cl. 305—10)

The present invention relates to tracks for track-type tractors or other similar vehicles and pertains particularly to the hinge connections between the track links which, in combination with ground engaging shoes, make up the track assembly.

Owing to the severe nature of the service to which tracks are subjected and to the environment in which they operate, the pivotal bearing connections between the track links constitute points at which considerable wear takes place. Pivotal connections of this type are continuously subjected to wear due to the dust and fine abrasives that gain entrance between the track pin and its associated track bushing. Although the track components are of necessity made of hard steel or the like, the high loads imposed on the hinge connections of an endless track of this type cause the bushings to wear into the pivot pins. This wear occurs predominantly on one surface of the pins; being the result of tensional loads imposed by the drive sprocket of the tractor in combination with the abrasive materials hereinabove described.

The accumulated wear in the entire track assembly results in chain elongation to the point where the track tensioning device of the tractor has insufficient capacity to maintain the track at suitable tension for effective operation.

It is customary therefore after the pins and bushing have worn to this extent to disassemble the entire track chain and rotate the bushings and pins approximately 180° thereby to present previously unused and unaffected surfaces in working contact.

In the present day hinge connection for tractor tracks the bushing member defines an abrupt step in the wear surface of the track pin which acts as a broach when said pin is driven out of the assembly causing damage to the otherwise reusable and previously unaffected parts of the track. Furthermore, after wear has been initiated bushing failures may also occur when the tractor is traversing an arcuate course. In a maneuver of this type the respective axes of the bushing and the cooperating pin are forced into angular relationship with respect to each other, causing the end of the bushing to carry a highly concentrated load as it impinges the pin. Conditions like these often result in fracturing of the end portion of said bushing.

It is, therefore, the principal object of this invention to provide an improved hinge connection for the articulate connections of an endless track of the type used in crawler tractors which under a condition of wear results in a formation including inclined ramps formed in the surface of the track pin so that upon disassembly of the track said ramp is effective to realign the track components so as to pilot the worn pin through the link bores without causing damage thereto. Another important object of this invention is to provide a track bushing wherein the internal surface of said bushing comprises a chamfered formation at each end thereof which will define an angular ramp in the worn surface of its associated track pin. Still another object of this invention is to provide a track bushing having chamfered ends constructed and arranged to permit limited flexibility of the track assembly without imposing concentrated stresses on the components of the connection. Further objects of the invention are made apparent in the following specification wherein reference is made to the accompanying drawings.

In the drawings:

Fig. 1 is a view in perspective of a track-type tractor illustrating a track assembly in which the present invention is employed;

Fig. 2 is a fragmentary view in section through one end of a track pin and bushing assembly;

Fig. 3 is a similar sectional view showing a worn track pin and illustrating the condition obtaining just prior to the disassembly of the track chain;

Fig. 4 is a sectional view of the other end of the hinge connection illustrating the method by which the pin is removed with the aid of the inclined ramp;

Fig. 5 is a section showing the manner in which the improved link of the present invention permits limited lateral displacement of one link assembly with respect to the adjacent link; and Fig. 6 is a central longitudinal sectional view of one of the hinge connections of the track assembly illustrating in broken lines the condition obtaining when the hinge pin is deflected by counteracting forces.

Referring to Fig. 1 a track-type tractor generally indicated 10 comprises a pair of track assemblies, one of which is indicated at 11, to propel the tractor along the ground. Track assembly 11 comprises an endless chain 12 having links 13 pivotally joined together as by pins 14 to permit the track to traverse a path around a driving sprocket 16 and a spring biased idler 17. A master pin connection, not shown, normally joins the two free ends of the track assembly but forms no part of this invention.

The track 11 is maintained under suitable tension by a spring recoil mechanism 18 to permit limited movement of the front idler 17 in order to prevent damage to the track assembly when foreign material, such as rocks, become lodged between the track and the sprocket 16 or the idler 17. This continual recoil of the track mechanism imposes a heavy load on the track components and results in wear between the hinge connections of the chain. As wear progresses the true length of the chain is altered because of the increasing pitch dimension and slack is taken up by a track adjusting member 19 of the tractor.

Referring particularly to Figs. 2 and 3 of the drawings, the improved bushing 20 is shown in its assembled condition with one of the inner sets of track links 21. This connection is usually a press-fit assembly in a bore 22 in said link 21 so that the link and bushing are in effect integral. An outer link 23 representing one of the pair of links in the assembly is likewise provided with a bore 24 and a counterbore 26 coaxial therewith. The counterbore 26 receives the end portion 27 of bushing 20 which extends outwardly from the link 21 to provide a journal between said bushing and the counterbore. To complete the assembly, the pin 14, of slightly greater diameter than that of bore 24, is pressed into the outer links to retain the track in its assembled condition.

The improved bushing of the present invention comprises a chamfered portion 30 formed inside each of its ends to define a triangular space in section, the altitude (A) of which represents a dimension equal to the maximum tolerable wear at each hinge connection; which dimension is the result of the total track adjustment dimension offered by member 19 when said dimension is divided by the number of track pins in the assembly. The base (B) of the triangular space is preferably, but not necessarily, equal to the depth of the counterbore 26 in each of the outer links.

In the condition illustrated in Fig. 3 the track pin has been worn to a point where the track adjusting mechanism 19 no longer can sufficiently tension the track. Because of the specific shape of the internal surface of the bushing 20 a comparable contour or ramp 33 is worn into the surface of pin 14 immediately adjacent the tension side of bushing 20. When the pins are worn to this degree it is customary to disassemble the track by driving out all the hinge pins and reassemble the track with the pins and bushings revolved approximately 180° so as to present relatively unaffected surfaces in working contact and thereby substantially double the life of the track. In the worn pin shown in Fig. 3 and Fig. 4 no damage will result as the pin 14 is driven out of the assembly as by a push pin 32 inasmuch as the worn contour of the pin presents the inclined ramp 33 to realign the bore 24 and the bushing 20 on the other side of the track assembly as the end of the pin 14 is pushed through. With previously used unchamfered bushings an abrupt shoulder was worn in the pin instead of the incline 33 and this shoulder would tend to break or broach out the bore 24 in the link.

The chamfered bushing of the present invention affords another advantage in that normally in the track assemblies presently in use, any thrust that tends to cause relative angular displacement of the axes of the pin and bushing of any one of the hinge connections imposes a highly concentrated stress which is caused by the end of the bushing impinging the surface of the pin. As shown in Fig. 5 the chamfered bushing of the present invention permits a limited degree of transverse angular displacement of one link assembly with respect to its adjacent link after an initial amount of wear has occurred on the track pin and the forces created by such displacement are dispersed over an area substantially equal to the hypotenuse of the triangular space defined by the chamfer 30.

Another condition heretofore detrimental to conventional type track bushings is track bushing failure caused by pin distortion as a result of counteracting forces on the hinge connection even though unaffected by wear. This condition is illustrated in broken lines in Fig. 6 where because of the chamfer 30 the highly concentrated corner loading effect is greatly minimized in that the loading is dispersed along a dimension approximating that of the hypotenuse of said triangular shape. This distortion also may occur when the track shoe is subjected to corner loading, as when the shoe encounters a protruding obstruction under one corner thereof. In this condition the forces exerted (indicated by arrows) are in a plane normal to that assumed in the condition previously described.

We claim:

1. A hinge connection between links of a tractor track chain comprising inner and outer sets of links having aligned bores, a bushing secured within the bores of said inner links with the ends of said bushing extending outwardly and received in counterbores in said outer links, and a pivot pin secured within the bores of said outer links; the combination therewith of a formation at each end of said bushing effective to define an inclined ramp in the surface of the pin as a result of wear.

2. A hinge connection between links of a tractor track chain comprising inner and outer sets of links having aligned bores, a bushing secured within the bores of said inner links with the ends of said bushing extending outwardly and received in counterbores in said outer links, and a pivot pin secured within the bores of said outer links and extending through the bushing; the combination therewith of a formation at each end of said bushing effective to define an inclined ramp in the surface of the pin as a result of wear, said formation comprising a chamfer of gradual taper.

3. A hinge connection between links of a tractor track chain comprising inner and outer sets of links having aligned bores, a bushing secured within the bores of said inner links with its ends extending outwardly and received in counterbores in said outer links, and a pivot pin secured within the bores of said outer links and extending through the bushing; the combination therewith of a formation at each end of said bushing effective to define an inclined ramp in the surface of the pin as a result of wear, said formation comprising a chamfer of gradual taper, wherein said taper defines a triangle in section; the altitude dimension of which is substantially equal to the maximum allowable wear permitted from the diameter of each said pin in the entire assembly as determined by the track adjusting mechanism of said tractor.

4. A hinge connection between links of a tractor track chain comprising inner and outer sets of links having aligned bores, a bushing secured within the bores of said inner links with its ends extending outwardly and received in counterbores in said outer links, and a pivot pin secured within the bores of said outer links and extending through the bushing; the combination therewith of a formation at each end of said bushing effective to define an inclined ramp in the surface of the pin as a result of wear, said formation comprising a chamfer of gradual taper, wherein said taper defines a triangle in section; the altitude dimension of which is substantially equal to the maximum allowable wear permitted from the diameter of each said pin in the entire assembly as determined by the track adjusting mechanism of said tractor, and wherein the base of said triangle is substantially equal to the depth of said counterbore.

References Cited in the file of this patent

UNITED STATES PATENTS

| | | |
|---|---|---|
| 1,924,161 | Knox | Aug. 29, 1933 |
| 2,118,961 | Alden | May 31, 1938 |
| 2,431,702 | McCann | Dec. 2, 1947 |
| 2,431,764 | McCann | Dec. 2, 1947 |
| 2,680,421 | Baker | June 8, 1954 |
| 2,719,063 | Dearlove | Sept. 27, 1955 |

FOREIGN PATENTS

| | | |
|---|---|---|
| 651,446 | Great Britain | Apr. 4, 1951 |
| 1,022,051 | France | Feb. 27, 1953 |